NON RESONANT CASE $$K\theta - I\omega^2\theta = T_o \cos \delta_2$$
$$\eta\omega\theta = T_o \sin \delta_2$$

RESONANT CASE $$\delta_2 = 90°$$
$$K\theta = I\omega_R^2 \theta$$
$$\eta\omega_R\theta = T_o$$

SRTC TORSION PENDULUM

INVENTORS:
W. P. GERGEN
J. C. CLARK
BY: A. H. McCauthy
THEIR AGENT

United States Patent Office 3,501,952
Patented Mar. 24, 1970

3,501,952
AUTOMATIC TORSION PENDULUM
William P. Gergen, Garden Grove, and John C. Clark, Lakewood, Calif., assignors to Shell Oil Company, New York, N.Y., a corporation of Delaware
Filed Aug. 28, 1967, Ser. No. 663,808
Int. Cl. G01n 3/38
U.S. Cl. 73—15.6    3 Claims

ABSTRACT OF THE DISCLOSURE

A system for automatically measuring and recording the viscous loss modulus and the modulus of elasticity of materials as a function of temperature. A sample material is driven into torsional forced oscillation where its motion is sensed, analyzed, and recorded automatically.

Background of the invention

This invention relates to an apparatus for characterizing materials and pertains more particularly to an apparatus for performing dynamic mechanical tests to broaden the analysis of polymer structures and composition.

It is known that transitions which are related to motions of portions of polymer chains can be detected by observing the changes in the dynamic mechanical loss modulus, known hereinafter as the modulus of viscosity, or in the modulus of elasticity of a specimen material as changes in temperature are made. The temperature of a transition, which is characteristic of a particular mode of motion, is governed by the activation energy of that particular motion. For example, several different types of motions have been observed in polymers. The lowest transition is found at temperatures less than 100° above absolute zero in branched polyethylene and is attributed to the onset of rotation of pendent methyl groups. The next transition is found at −120° C. in the amorphous phase of polyolefins and at a somewhat lower temperature in diene rubbers. The next transitions are exhibited by amorphous polymers or by the amorphous phase of crystalline polymers and are glass transitions. The highest transition is the one corresponding to the melting point in crystalline polymers such as nylon. Since dynamic mechanical properties are sensitive to transitions and thus provide a key for determining structure and composition, it is desirable to have an apparatus for conveniently measuring dynamic mechanical properties.

In the past instruments have been developed to make such measurements; however, the instruments presently available suffer from the drawback of requiring a considerable amount of time to set-up and run the tests. For example, the classical free vibration torsion pendulum is often used for making these tests. However, its use requires that for each point on a given modulus of viscosity vs. temperature spectrum, the temperature must be established and measured, the pendulum must be displaced and allowed to relaxation oscillate, measurements of the oscillation frequency and amplitude must be made, and modulus calculations performed from this data. With so many time consuming steps necessary for each point on the curve, it is plain that the plotting of a modulus of viscosity vs. temperature spectrum is very tedious and time consuming. It is therefore an object of this invention to provide a system for efficiently and conveniently performing dynamic tests on solids or semi-solids with a minimum of operator involvement.

Summary of the invention

A torsion pendulum consisting of a torsionally compliant member, a drive coil, a pickup coil, and a sample of the material to be characterized are mounted for torsional motion such that the torsionally compliant member and the sample are both torsionally flexed. The drive and pickup coils are mechanically coupled to the torsionally compliant member and sample so that all four elements see the same motion.

A signal voltage at a controlled frequency from a sine wave generator is amplified to a controlled level and applied to the driving coil. A voltage proportional to the velocity of the pickup coil is generated therein. The voltage is then integrated and compared with a predetermined amplitude. A variation of the driving force is automatically made to correct for any existing difference between the integrated velocity voltage and the predetermined amplitude. At the same time the phase relationship between the integrated velocity voltage and driving current is compared to a desired relationship at resonance in a phase comparator. The frequency of the sine wave generator is automatically altered to correct any difference in phase. The change in driving current required to maintain the torsion pendulum at a constant amplitude of deflection and the change in resonant frequency provide the input to a computer section where they are operated upon and recorded.

To establish the background for measuring the dynamic parameters mentioned above, reference is made to the classical torsional pendulum, where the equations of motion can be written directly from an application of Newton's second law of motion in polar form, $$\Sigma T = I \frac{d^2\theta}{dt^2} \tag{1}$$

$$I \frac{d^2\theta}{dt^2} + \eta \frac{d\theta}{dt} + K\theta = 0 \tag{2}$$

where:

$\Sigma T$ = algebraic summation of all torques exerted on the rotational body $I$ = polar moment of inertia of the system $\frac{d^2\theta}{dt^2}$ = angular acceleration $\theta$ = angular displacement $\frac{d\theta}{dt} = \omega = 2\pi \times$ frequency = angular velocity $K$ = spring constant (units are force per unit displacement)

$\eta \frac{d\theta}{dt}$ = retarding torque due to viscous damping

When the system of Equation 2 is subject to a driving force, the zero on the right side of Equation 2 is replaced by the forcing function. If a forcing function $T = T_0 \sin \omega t$ is chosen then Equation 2 becomes $$I \frac{d^2\theta}{dt^2} + \eta \frac{d\theta}{dt} + K\theta = T_0 \sin \omega t$$

The steady state solution of this equation takes the form of $$\theta = \theta_0 \sin (\omega t + \delta)$$

where $\delta$ is the angle by which the deflection lags the applied torque.

Figure 1A:
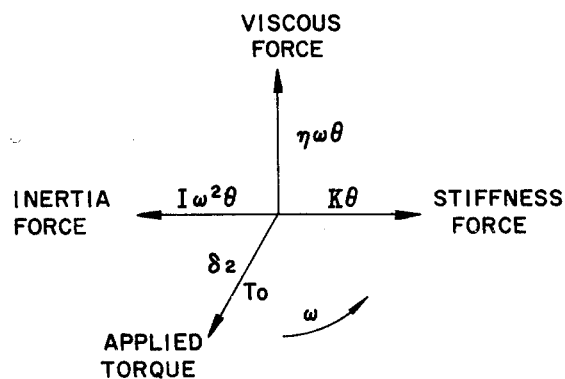
FIGURE 1a is a vector diagram of the torsion pendulum system for the general case.
Figure 1B:
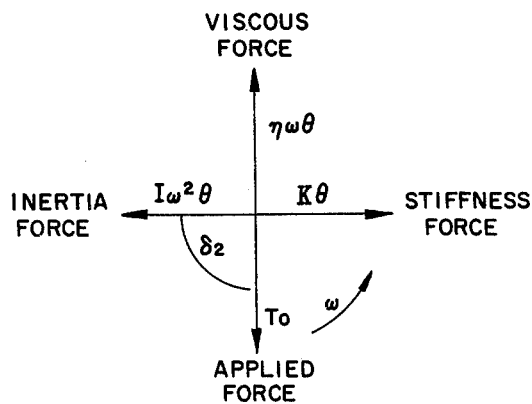
FIGURE 1b is a vector diagram of the torsion pendulum system for the resonant case.

The mechanical system is best represented with the use of vectors as shown in FIGURES 1a and b. The entire vector system is rotating with an angular velocity $\omega$. At very low frequencies, that is $\omega$ near zero, the work done by the external torque is used to overcome the spring stiffness, K. The vector $T_0$ is equal and opposite to the vector $K\theta$ and the deflection $\theta$ is in phase with the force. As the frequency is increased from zero, the vectors $I\omega^2\theta$ and $\eta\omega\theta$ begin to grow and the force vector must then have compounds in two directions to maintain a steady state condition. The horizontal component $T_0 \cos \delta$ is in phase with the deflection and adds to the inertia vector $I\omega^2\theta$ to overcome the magnitude of the stiffness vector $K\theta$; while the vertical component equal to $T_0 \sin \delta$ is 90° out of phase with the deflection and balances the loss vector $\eta\omega\theta$. The resultant vector, $T_0$, thus describes an angle $\delta$ with the deflection vector. As the frequency is further increased the vector $I\omega^2\theta$ containing the term $\omega^2$ grows at a faster rate than the loss vector $\eta\omega\theta$. It reaches a point where it just balances the stiffness vector. The horizontal component of force, $T_0 \cos \delta$ is then equal to zero and the force and deflection are 90° out of phase. During alternate quarter cycles, the kinetic energy of motion of the mass is stored as elastic energy in the spring and the elastic energy of the spring is given up as kinetic energy of motion in the mass while all the work done by the external force is dissipated in the losses $\eta\omega$. This phenomena occurs at the so-called natural or resonant frequency, $\omega_r$, of the system. Since the viscous force $\eta\omega$, is defined as $G''$, it becomes clear that $G''$ can be determined by measuring the driving force required to maintain a constant deflection, $\theta$, at the natural frequency, $\omega_r$; and, $G'$, the stiffness force, can be determined by measuring the natural frequency. This is accomplished by the system as herein described.

Description of preferred embodiment

If a coil is situated in a magnetic field of constant flux density and axially mounted to rotate about one of its diameters then a current $i=i_0 \sin \omega t$ passing through the coil will exert a force or torque $T=T_0 \sin \omega t$ on the coil given by $T=Ci_0$, where C is an apparatus constant dependent on the coil dimensions and the strength of the magnetic field. A measure of the torque producing current $i_0$ leads to the direct measurement of $G''$. The coil will oscillate with an instantaneous velocity $v=V_0 \sin (\omega t+\delta)$; if a similar coil is situated in the same magnetic field, the instantaneous open-circuit voltage generated in the second coil is $e=cv$. As in any harmonic motion the velocity will be 90° out of phase with deflection and therefore at resonance 180° out of phase with force (since at resonance the force is 90° out of phase with the deflection). Resonance is thus detected by an observation of the 180° phase angle between the velocity voltage and the torque producing current or by the 90° phase angle between the integrated velocity voltage and the torque producing current. This preceding observation represents the basis for the phase tuning used in this invention.

Figure 3:
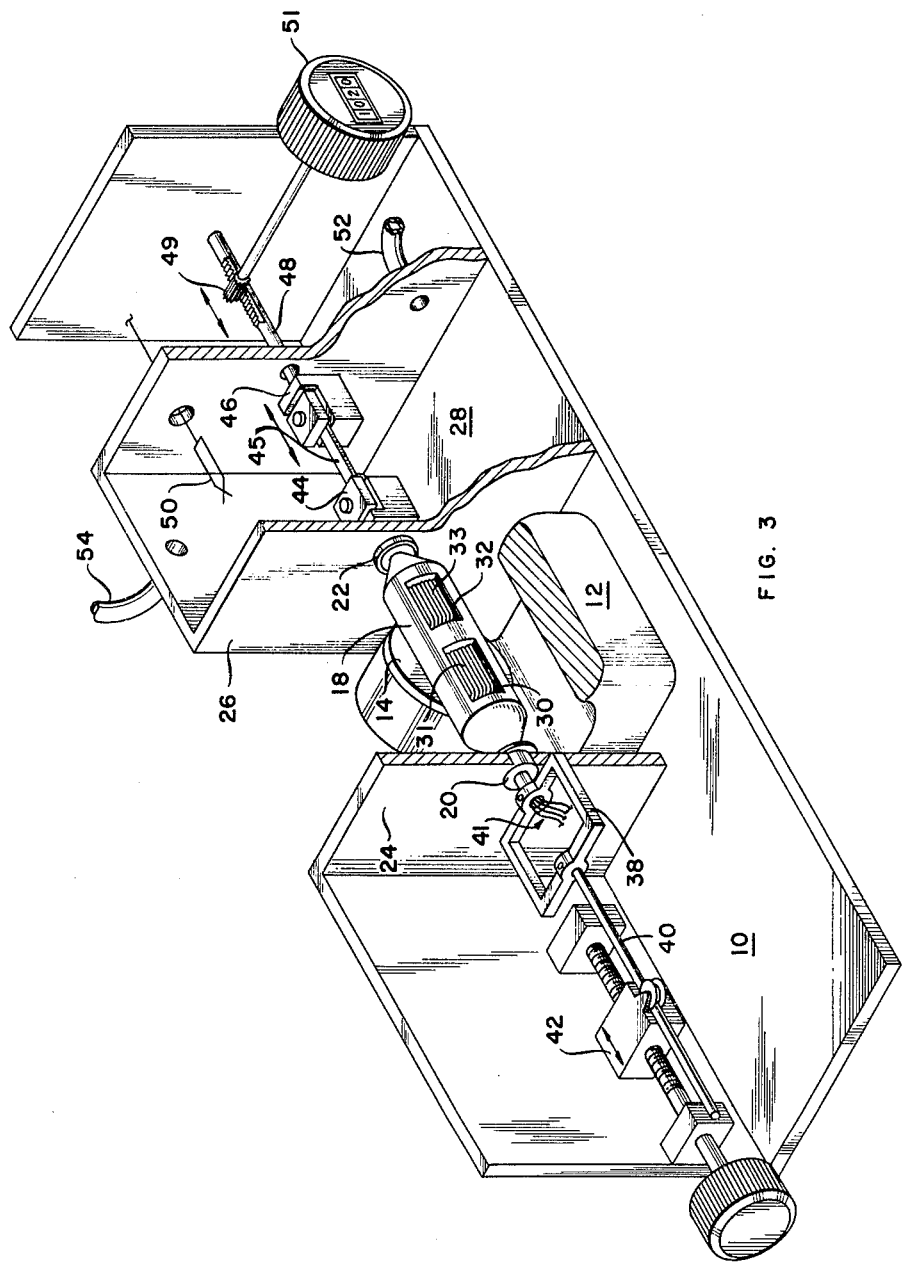
FIGURE 3 is a perspective drawing of the mechanical apparatus and portion of the electrical apparatus for performing the measurements.

Referring now to FIGURE 3, a magnet 12 is mounted on a base plate 10 with an air gap defined by pole faces only one of which, 14, is shown. Positioned in the air gap between the pole faces is a coil rod 18. The coil rod is horizontally mounted in bearings 20 and 22 that are positioned in a vertical support 24 and near wall 26 of a sample chamber 28 respectively. The coil rod is provided with two slots 30 and 32 into which two bobbin mounted coils 31 and 33 respectively are cemented. External leads from the coils 31 and 33 are brought through the center of coil rod 18 and are shown reaching the outside at point 41. A yoke 38 is attached to the end of coil rod 18 to couple the coil rod to one end of a torsionally compliant member 40. The torsionally compliant member 40 is firmly attached to the yoke so it is unable to move with respect to the yoke. The other end of the torsionally compliant member 40 is firmly attached to a vertical support 42. A torisonally compliant member can be any member that obeys Hooke's law. Some examples are torsion spring elements such as a wire or cord suspension, a helical or tapered leaf spring, and a torsion bar. The preferred embodiment uses a torsion bar for a torsionally compliant member.

The opposite end of the coil rod 18 extends through the near wall 26 of the sample chamber 28 and is terminated in a clamping fixture 44 into which one end of the sample material to be characterized 45 is clamped.

The sample chamber 28 is mounted on base plate 10 and has four vertical walls and a top. The sample chamber would typically be made of relatively thermal insulating material and with relatively high hermeticity. A second clamping fixture 46 is attached to an extension rod 48 that passes through the far wall of the sample chamber. The extension rod 48 is connected to a conventional rack and pinion 49 arrangement for directly reading the length of the specimen. The sample chamber 28 is provided with a gas input hose 52 and gas exhaust hose 54 through which an appropriate gas such as nitrogen or argon can be passed.

The temperature of the sample may be controlled by altering the temperature of the gas passing through the sample chamber. For example, the chamber may be cooled by passing dry nitrogen through a copper coil immersed in a liquid nitrogen bath, then through a copper coil provided with a thermostat, and finally exhausting the gas into the chamber through input hose 52. Alternately, the chamber may be heated by passing nitrogen through a pipe filled with stainless steel shavings and nested in a furnace or passing nitrogen across the flights of a contained heated screw and then into the sample chamber. The sample temperature may be controlled and programmed by correlating the chamber temperature with gas flow. Sample temperature measurements are made by a thermocouple 50 in close proximity to the sample.

Figure 2:
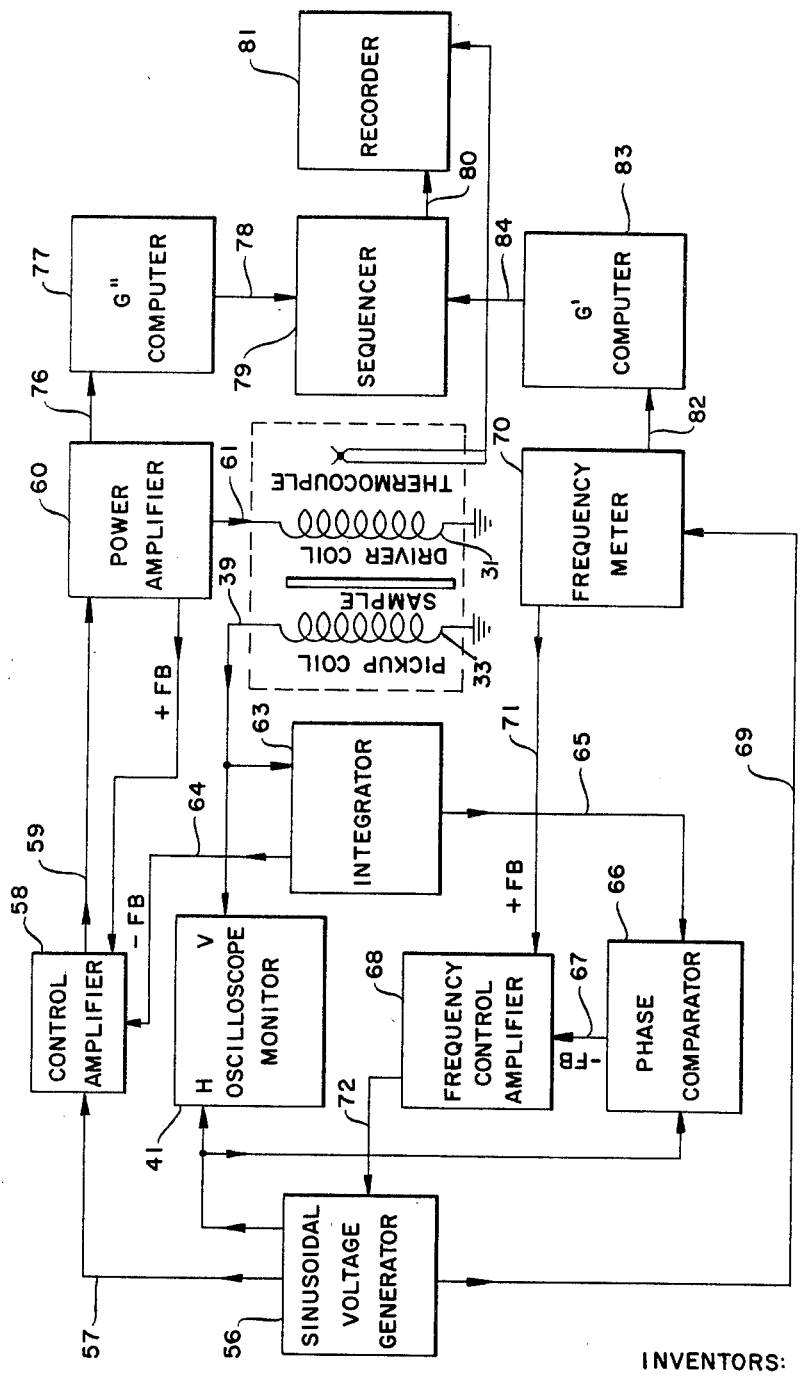
FIGURE 2 is a block diagram of the electrical system.

Referring now to FIGURE 2, there is shown the system for determining the dynamic mechanical properties of the sample. Sinusoidal signal generator 56 provides a low frequency sinusoidal signal and is coupled through lead 57 to control amplifier 58. Controls on control amplifier 58 establish the ampiltude of the output signal from control amplifier 58. The amplitude controlled signal from control amplifier 58 is then conveyod by lead 59 to power amplifier 60 where the signal is amplified to a level sufficient to drive the mechanical portions of the system. Lead 61 from power amplifier 60 is connected to the bobbin mounted coil 31 cemented into slot 30. Coil 31 situated in the magnetic field of permanent magnet 12 then experiences a force or torque in accordance with the principals established above when a signal from power driver 60 is applied. The force is mechanically transmitted from the coil to the coil rod and thus to the torsion bar 40 and sample 45. If the applied signal from amplifier 60 is of the form $I=I_0 \sin \omega T$, then the coil rod, torsion rod, sample system will oscillate with an instantaneous velocity $v=V_0 \sin (\omega t+\delta)$.

Coil 33 cemented into slot 32 is also situated in the magnetic field provided by permanent magnet 12. The open circuit voltage generated in coil 33 will be of the form $e=E_0 \sin (\omega t+\delta)$ in accordance with the principles discussed above. Coil 33 has leads 39 that are connected to the input of integrator 63. The voltage generated in coil 33 is integrated in integrator 63. The output of integrator 63 is thus a function of the displacement of coil rod 18 since the integral of velocity is displacement. The signal generated by coil 33 is also fed directly to the vertical input of an oscilloscope monitor 41.

The output signal of integrator 63 is taken through lead 64 to the input of control amplifier 58 where its amplitude is compared with an internally generated reference voltage corresponding to the desired displacement. Any difference between the two voltages is used to adjust the signal supplied to power amplifier 60 to maintain a constant amplitude of oscillation.

The output of integrator 63 is also fed through lead 65 to the input of phase comparator 66, where the phase of the integrator output is compared with the phase of the sinusoidal signal generator output. The output of phase comparator 66 is a DC signal proportional to the difference in phase of the two inputs and is fed through lead 67 to one input of frequency control amplifier 68.

A signal from sinusoidal signal generator 56 is provided through lead 69 to the input of frequency meter 70. A DC output proportional to the frequency is then fed from the output of frequency meter 70 through lead 71 to a second input of frequency control amplifier 68.

The output of phase comparator 66 when supplied to the input of frequency control amplifier 68 causes the frequency control amplifier to change its output signal. This in turn causes the sinusoidal signal generator to increase or decrease the frequency of its output signal to keep the difference in phase between the integrator output and the sinusoidal generator signal constant.

The output of frequency control amplifier 68 provides a DC signal through lead 72 to the input of sinusoidal voltage generator 56. The frequency of the sinusoidal generator output is controlled by the DC level of the output from frequency control amplifier 68. The DC level of the output of the frequency control amplifier 68 is controlled by the input from the frequency meter 70 whose output is a DC signal directly proportional to the frequency of its input. The output of phase comparator 66 and the output of frequency meter 70 are joined in control amplifier 68 so that a change in either input will cause a control change in the output of the frequency control amplifier.

An alternative way of achieving a controlled phase relationship such as resonance is to take the output voltage from coil 33 and connect it directly to control amplifier 58. The voltage generated from coil 33 equal to $v_0 \sin(\omega t + \delta)$ would cause power amplifier 60 to supply a current $i_0 \sin \omega t$ to driver coil 31. Sustained oscillation occurs only for an angle $\delta$ of 180°. If zero phase shift is present in control amplifier 58 and power amplifier 60, high efficiency will be secured at the resonant or excitation frequency. As changes in the sample are reflected on the torsion pendulum system, the frequency of oscillation in this self excitation mode is self-adjusting. In this embodiment sinusoidal voltage generator 56, phase comparator 66, and frequency control amplifier 68 are eliminated.

The output of power amplifier 60 is supplied through lead 76 to the G" computer 77 whose output is supplied through lead 78 to sequencer 79 and then through lead 80 to the Y input of X-Y recorder 81.

The output of frequency meter 70 is supplied through lead 82 to the G' computer 83 whose output is in turn taken through lead 84 to sequencer 79 and then through lead 80 to the Y axis of recorder 81.

The computer sections could, of course, be accomplished in several other ways. For example, each computing function could be done on a single analog computer properly programmed. Alternately, the inputs could be translated into digital form with an analog to digital converter and the solutions calculated on a digital computer. However, the functions are sufficiently simple that a special purpose computer with minimal circuitry does a satisfactory job. Since the solution for G" involves only the subtraction of two currents, a simple differential amplifier is sufficient. One current is a measure of the power required to drive a torsion pendulum without the sample material and is a constant for any given deflection. The other current is a measure of the power required to oscillate the torsion pendulum with the sample included. The output of the amplifier is proportional to the difference in the two inputs and the constant factor is accounted for by the amplifier gain.

The solution for G' involves the difference of the square of two frequencies. The two squared terms are factored to the sum and difference of the two frequencies and converted to logarithms. The constant is also converted to a logarithm and summed with the log of the sum and the log of the difference of the frequency. The output can then be plotted directly as the log G' as a function of temperature.

The changes in the driving frequency, about ±10 Hz., needed to maintain resonance are relatively small; their effect on the viscous modulus and the effect not treated a priori above on the elastic modulus is negligible.

Operation

The sample to be tested, 45, is first firmly fixed in clamp 44. Micrometer dial 51 is then adjusted to obtain minimum longitudinal compression. Clamp 46 is then tightened to firmly fix the sample to the remainder of the torsion pendulum structure. Thus the material to be tested and the torsionally compliant member are serially connected.

The frequency of signal generator 56 is adjusted to about 30 cycles per second; the signal generator 56 is actuated causing the torsion rod, driver coil, and sample to oscillate; and the initial amplitude of oscillation is adjusted to some nominal value within the small angle approximation made in the analysis of motion.

The temperature in the sample chamber, after being set at a designated initial valve, is gradually increased by controlling the temperature of the gas in the sample chamber. The thermocouple 50 continuously monitors the temperature and supplies a signal proportional to the sample temperature to the X axis input of recorder 81. As the sample temperature gradually increases, the resonant frequency of the system will gradually change as will the power required to maintain a constant amplitude of oscillation. These parameters fed into the computer section are then processed and sequentially applied to the Y axis of recorder 81. The result is a plot of G' and G" as a function of temperature.

Thus it can be seen that by uniquely combining a torsion pendulum, a driving means, a motion detecting means, a vibration-amplitude control means, a frequency control circuit, a phase detecting circuit, and a computer, the modulus of viscosity and modulus of elasticity can be automatically determined.

We claim as our invention:

1. An automatic apparatus for characterizing materials comprising:
   a torsion pendulum, said torsion pendulum being mounted for harmonic torsional motion; said torsion pendulum further being comprised of a torsionally compliant member serially connected to the material to be tested;
   a heating means, said heating means being disposed to continuously vary the temperature of the material;
   a driving means, said driving means being coupled to said torsion pendulum to drive said torsion pendulum in a harmonic mode;
   a motion detecting means, said motion detecting means being coupled to said torsional pendulum to detect the amplitude and frequency of the torsional motion of said torsion pendulum;
   a vibration-amplitude control means, said vibration-amplitude control means being coupled between said motion detecting means and said driving means to maintain said torsion pendulum at a particular amplitude of oscillation;
   a frequency control circuit, said circuit being coupled between said driving means and said motion detecting means, said circuit in addition automatically changing the driving frequency to maintain said pendulum in resonance;
   a phase comparator circuit having an input operatively coupled to said motion detecting means, said circuit being adapted to compare the phase of the motion of said torsional pendulum to the phase of said driving means and supply a DC output signal proportional to the difference therebetween; said phase comparator being coupled to said frequency control circuit to control said driving frequency; and, a computer, said computer receiving its input from said frequency control and from said driving means to calculate and log data.

2. The apparatus of claim 1 wherein said torsion pendulum consists of a housing;

a torsion bar, one end of which is fixed to said housing with the other end mechanically coupled to said driving means, and said specimen, one end of which is fixed to said housing with the other end mechanically coupled to said driving means.

3. In a method of continuously determining the modulus of viscosity and the stiffness force of a sample material as a function of temperature, the steps:

torsionally driving said sample material whereby said sample experiences torsional, simple harmonic motion;

maintaining the amplitude of said motion of said sample at a predetermined value at which small angle proximations are valid;

continuously adjusting the frequency of the motion of said sample to maintain said sample in resonance;

continuously varying the temperature of said sample between two predetermined values;

detecting and recording the power supplied to drive said sample material.

References Cited

UNITED STATES PATENTS

| | | | |
|---|---|---|---|
| 2,150,377 | 3/1939 | Keinath | 265—13 |
| 2,836,060 | 5/1958 | Ciringione et al. | 73—99 |
| 3,313,148 | 4/1967 | Dautreppe et al. | 73—99 |

CHARLES A. RUEHL, Primary Examiner

U.S. Cl. X.R.

73—67.2, 99